(12) United States Patent
DeMayo

(10) Patent No.: US 7,003,827 B2
(45) Date of Patent: Feb. 28, 2006

(54) OPERATING TABLE SUPPORT CLAMP

(75) Inventor: Edward N. DeMayo, San Raphael, CA (US)

(73) Assignee: Innovative Medical Products Inc., Plainville, CT (US)

( * ) Notice: Subject to any disclaimer, the term of this patent is extended or adjusted under 35 U.S.C. 154(b) by 0 days.

(21) Appl. No.: 10/872,029

(22) Filed: Jun. 21, 2004

(65) Prior Publication Data
US 2005/0278851 A1 Dec. 22, 2005

(51) Int. Cl.
*A61B 19/00* (2006.01)
(52) U.S. Cl. .................. 5/600; 5/601; 248/229.14
(58) Field of Classification Search ................ 5/600, 5/607; 248/229.12, 229.14, 229.22, 229.24, 248/228.5, 230.5, 231.61
See application file for complete search history.

(56) References Cited

U.S. PATENT DOCUMENTS

| | | | | |
|---|---|---|---|---|
| 5,571,072 A | * | 11/1996 | Kronner | 600/102 |
| 6,370,741 B1 | * | 4/2002 | Lu | 248/229.12 |
| 6,499,158 B1 | * | 12/2002 | Easterling | 5/600 |
| 6,895,617 B1 | * | 5/2005 | Zacharopoulos et al. | 5/601 |
| 6,912,959 B1 | * | 7/2005 | Kolody et al. | 5/601 |

* cited by examiner

Primary Examiner—Frederick L. Lagman

(57) ABSTRACT

In accordance with the invention, a first lever is employed to secure a surgical knee positioner unit to the operating table and a second lever is employed to positionally adjust the surgical knee positioner, per se.

3 Claims, 4 Drawing Sheets

OPERATING TABLE SUPPORT CLAMP

FIELD OF INVENTION

This invention relates to apparatus of the type used for the positive positioning of feet, knees, etc., for surgical and other medical activities and the preferred embodiment has particular utility in the positioning of the human knee for surgery including such procedures as total knee replacement, in which the knee must be maintained in the selected optimum position.

BACKGROUND OF THE INVENTION

U.S. Pat. No. 5,462,551 entitled "Knee Positioner" describes limb surgery on the human body including knees, knee replacement, fracture repair, as well as similar hand, foot, and ankle surgery such that the joint or limb to be operated on is precisely and predictably positioned during such surgery.

Optimum positioning requires a large range of positive positioning adjustments to be easily available so that the limb or joint to be treated is initially positioned and thereafter maintained in the desired position.

The aforementioned knee positioner utilizes a first knob for controlling flexion and extension, a second knob for controlling rotation, a third knob to attach the knee positioner to the table and a lever to release the surgical boot.

It would be functionally and economically advantageous to provide such a knee positioner with a single lever to clamp the knee positioner to the operating table and a simple lever for simple and easy adjustment of the knee positioner unit, per se.

SUMMARY OF THE INVENTION

In accordance with the invention, operating table clamp support having a first lever is employed to secure a surgical knee positioner unit to the operating table via a pair of U-shaped jaws. A second lever on the knee positioner unit is employed to positionally adjust the surgical knee positioner by means of a support rail and track assembly.

DESCRIPTION OF THE PREFERRED EMBODIMENTS

Figure 1:
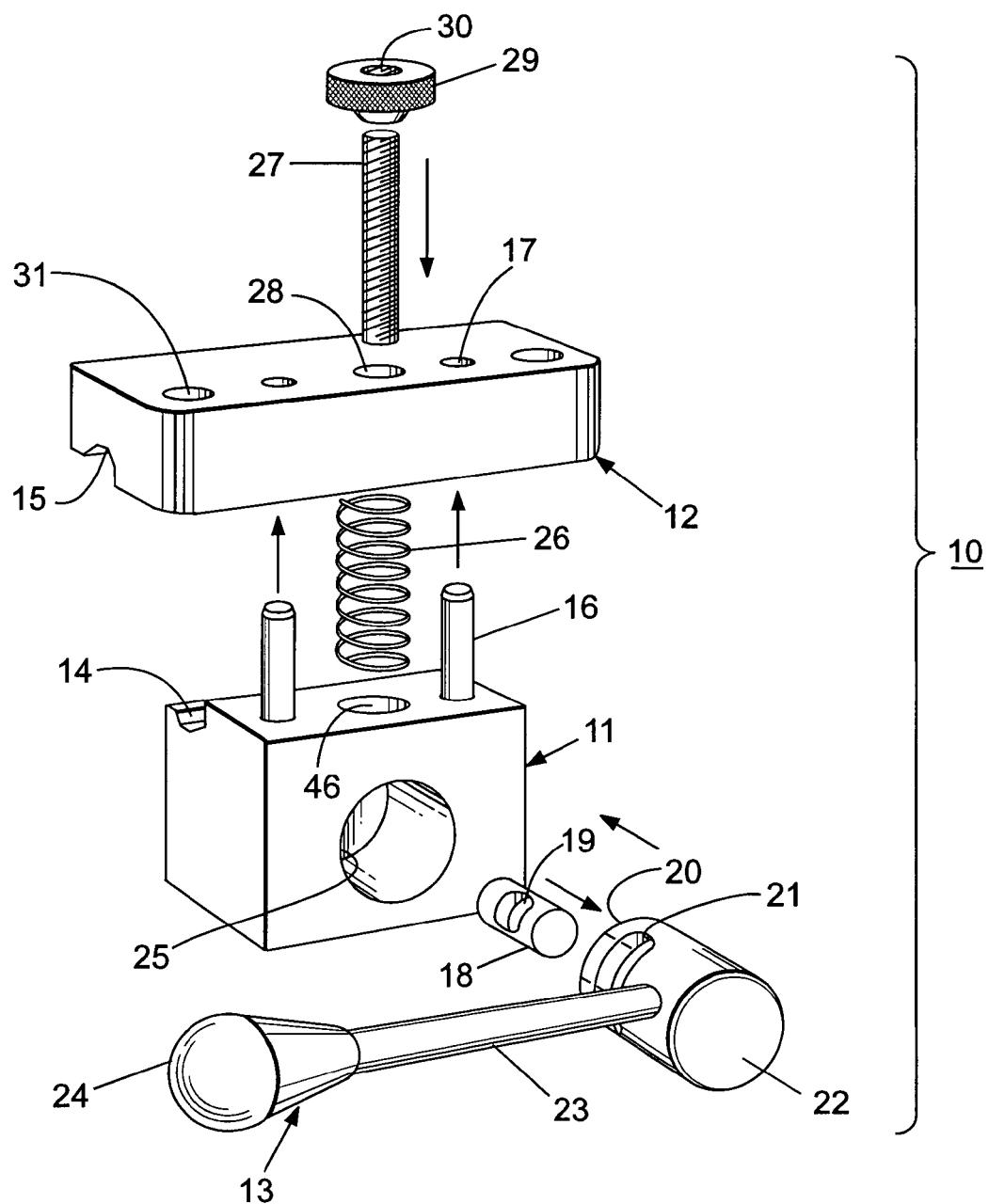
FIG. 1 is a front perspective view of the clamp lever arrangement components of the invention in isometric projection prior to assembly.
Figure 2:
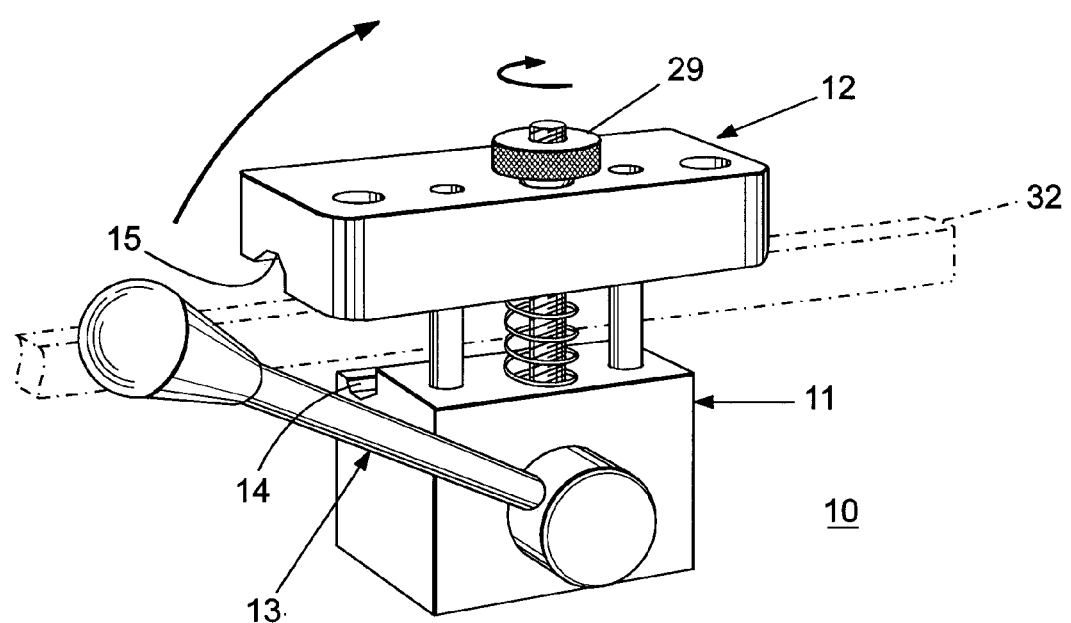
FIG. 2 is a front perspective view of the clamp lever arrangement components of FIG. 1, fully assembled.

The operating table clamp support 10 as shown in FIGS. 1 and 2 includes a base clamp 11 and a top clamp 12. An operative lever 13 is assembled to the base clamp 11 for controlling the position of the U-shaped jaws 14 and 15 in the manner to be described below in greater detail.

A pair of upstanding guideposts 16 is attached to a top surface of the base clamp 11 for reception within a corresponding pair of guide apertures 17 for supporting the top clamp 12 upon the base clamp 11 in clearance relation. The compression spring 26 is positioned intermediate base clamp 11 and top clamp 12 prior to assembly for controlling the movement of the top clamp upon rotation of the operative lever 13. The elongated cam 18 includes a threaded slot 19 and is positioned within the aperture 20 extending within the cam-shaped end 22 of the operative lever 13 such that the threaded slot 19 on the elongated cam 18 aligns with the elongated slot 21 formed on the cam-shaped end 22.

The forward end of the cam-shaped end 22 is next positioned within clearance opening 25 in the base clamp 11 and the threaded rod 27 is first inserted thru the aperture 28 in the top clamp 12, thru the compression spring 26, thru the aperture 46 in the top of the base clamp 11, thru the aperture 21 in the top of the cam-shaped end 22 and threadingly attached to the threaded aperture 19 within the elongated cam 18. The knurled cap 29 next engages the top of the threaded rod 27 via the threaded aperture 30 to retain the top clamp 12, base clamp 11 and operating lever 13 as a complete assembly. The handle 24 on the end of the operating rod 23 facilities movement of the operating table clamp 10.

The operating table clamp support 10 is positioned over the operating table rail 32, shown in phantom in FIG. 2 in the following manner. The U-shaped jaws 14 and 15 on the operating table clamp support are positioned on opposite edges of the operating table rail 32 and the knurled knob 29 is rotated in the clockwise indicated direction to secure the jaws together.

Figure 3:
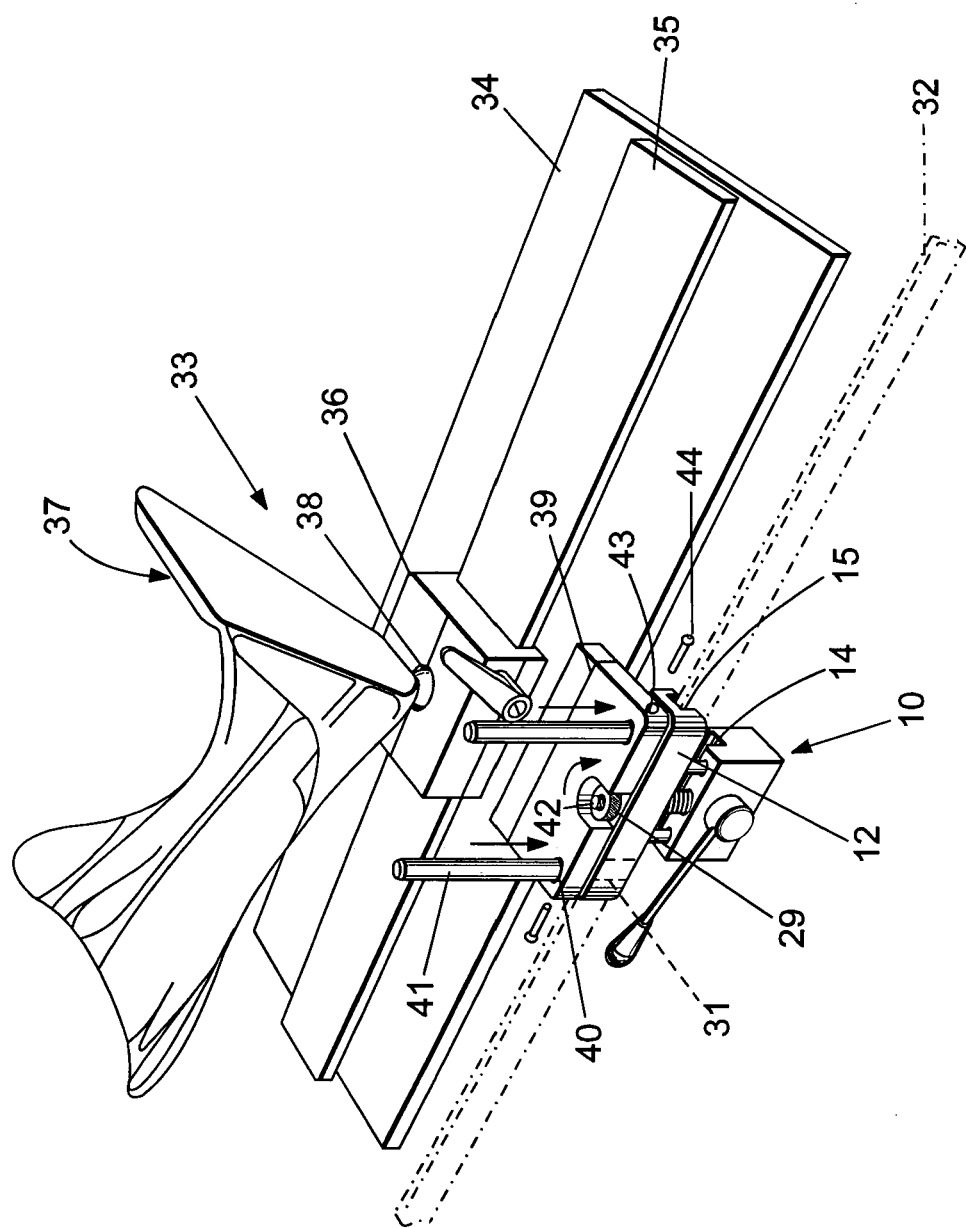
FIG. 3 is a front perspective view of a foot retainer device prior to attachment to the operating table via the clamp lever arrangement of FIGS. 1 and 2.

As shown in FIG. 3, the knee positioner unit 33 that carries the knee support flex boot 37 via the pivot support 38 that is fixed to the rail 36 carried by the upstanding track 35 on the support platform 34, is one type of operating support device that can be used with the operating table clamp support 10 in accordance with the invention. The connecting plate 39, that is fixedly attached to the support plate 34, includes a pair of spaced apertures 40 thru which the support posts 41 are inserted down into the apertures 31 formed in the top plate 12 of the operating table clamp 10, as shown earlier in FIG. 1. When the support posts are completely within the apertures 31, they are fastened therein via a pair of setscrews 44 inserted within the apertures 43 formed in the connecting plate 39. To provide access to the knurled knob 29, when the operating table clamp support 10 engages the operating table rail 32 and the knee positioner unit 33, a slot 42 is formed on the connecting plate 39 of the knee positioner unit.

Figure 4:
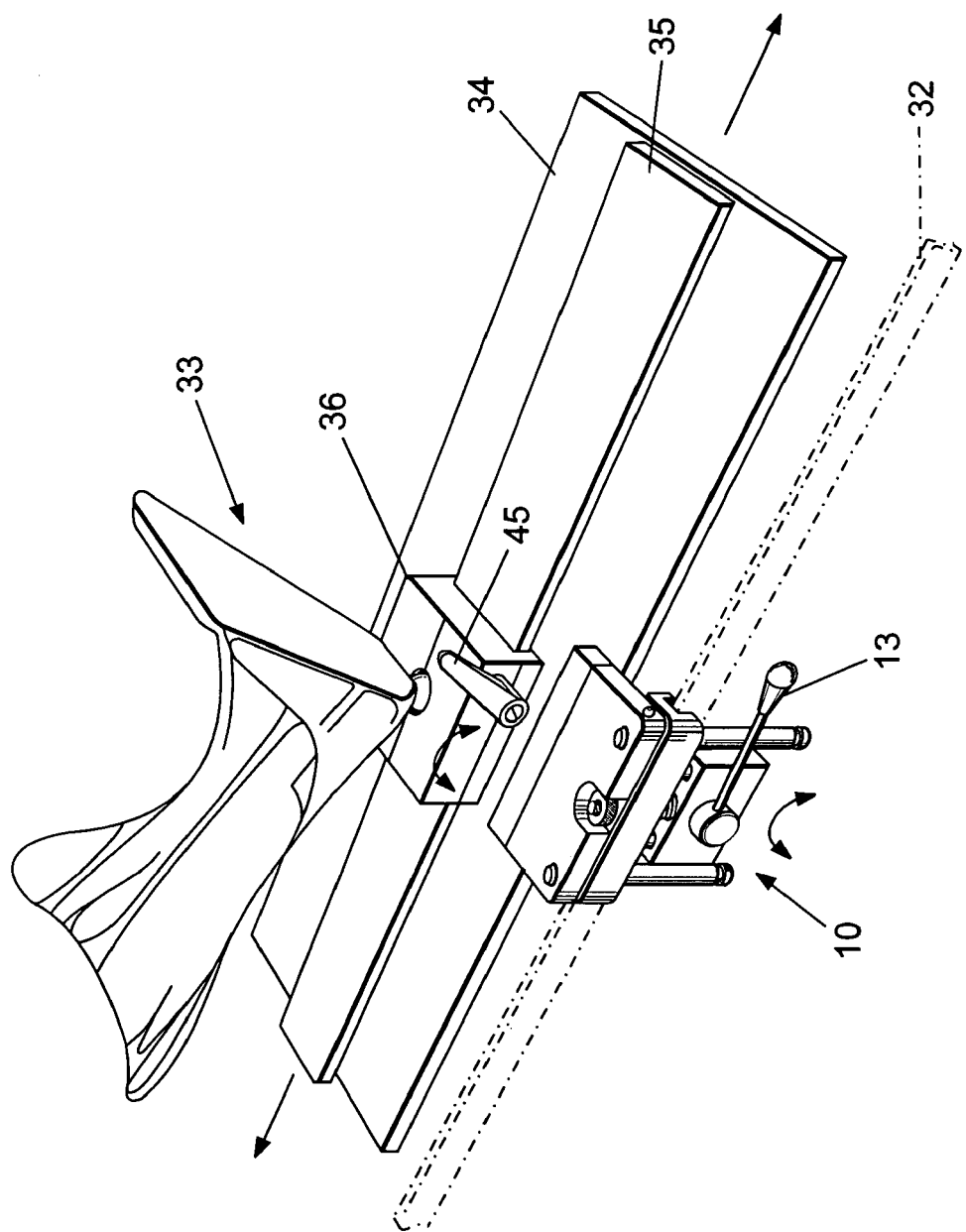
FIG. 4 is a front perspective view of the foot retainer device of FIG. 3 after attachment to the operating table via the clamp lever arrangement of FIGS. 1 and 2.

The operation of the operating table clamp support 10 and the knee positioner unit 33 is best understood by now referring to FIG. 4.

To move the knee positioner unit 33 along the operating table rail 32, in the forward and reverse indicated directions, the operative lever 13 is rotated to the counterclockwise-indicated direction, which rotates the elongated cam 18 (FIG. 1) and unlocks the operating table clamp support 10 from the operating table rail 32. When the knee positioner unit 33 is in the desired position, the operative lever 13 is rotated to the clockwise-indicated position, to lock the operating table clamp support 10 and the knee positioner unit 33 onto the operating table rail 32.

To move the knee positioner unit 33 along the support platform 34, in the forward and reverse indicated directions, the adjustment lever 45 on the rail 36 is rotated to the counter-clockwise indicated direction to loosen the tension applied between the rail and the up-standing track 35 in the manner described in the aforementioned U.S. Pat. No.

5,462,551. When the knee positioner unit 33 is at the desired location, the adjustment lever 45 is rotated in the clockwise-indicated direction to lock the knee positioner unit 33 in place.

A simple operating table clamp support employing a single lever for fastening and releasing operating table surgical support equipment has herein been described in conjunction with an operating table knee positioner unit employing a single lever for movement of the knee positoner unit, per se.

What is claimed is:

1. An operating table clamp support comprising:
    a base clamp having a base jaw arranged for positioning on one side of an operating table side rail;
    a top clamp moveably connecting with said base clamp and having a top jaw arranged for positioning on an opposite side of said operating table side rail;
    an operating lever having one end partially extending within said base clamp for moving said top clamp toward said base clamp whereby said base jaw and said top jaw engage said operating table side rail, said one end of said operating lever enclosing an apertured cam;
    a threaded rod extending within said base clamp and said top clamp, said threaded rod defining first and second ends, said first end of said threaded rod including means for fastening said top clamp to said bottom clamp, said second end of said threaded rod extends within said apertured cam wherein said one end of said operating lever includes an operating lever aperture for providing access to said apertured cam therein; and
    means extending from a top part of said top clamp for supporting operating table surgical support equipment.

2. The operating table clamp support of claim 1 including at least one guide post extending between said base clamp and said top clamp for guiding movement between said top clamp and said base clamp.

3. The operating table clamp support of claim 1 including a compression spring arranged around said threaded rod, intermediate said base clamp and said top clamp for urging said top clamp away from said bottom clamp.

* * * * *